United States Patent Office 3,310,519
Patented Mar. 21, 1967

3,310,519
NON-FLAMMABLE VINYLIDENE CHLORIDE
POLYMER SOLUTIONS
Harold G. Hahn, Midland, and Norman A. Lefevre, Bay
City, Mich., assignors to The Dow Chemical Company, Midland, Mich., a corporation of Delaware
No Drawing. Filed Oct. 3, 1962, Ser. No. 228,786
10 Claims. (Cl. 260—33.8)

This invention relates to improved lacquer compositions. More particularly, it relates to relatively non-flammable lacquer coating compositions based upon certain vinylidene chloride-vinyl chloride copolymers.

Crystalline copolymers composed predominently of vinylidene chloride and relatively small but significant amounts of vinyl chloride copolymerized therewith have outstanding properties in regard to impermeability to moisture vapor and other gases when fabricated into films and coatings. Another characteristic property of these copolymers is insolubility in almost all organic solvents. A still further characteristic is the close proximity of the softening points to the temperature at which severe degradation occurs. Because of their low moisture vapor transmission as well as their clarity and other properties, the crystalline copolymers of vinylidene chloride and vinyl chloride are highly useful coating materials for other more permeable films such as cellophane. However, considerable difficulty has been encountered in applying the copolymers as a film to the desired substratum. The proximity of their softening and decomposition temperatures generally precludes melt coating, extrusion or thermal lamination. It has further been found that latexes of such copolymers have relatively short storage stability. Casting a lacquer of the copolymer on the substratum has been most promising. However, the lack of solubility of such copolymers in most organic solvents has made it necessary to resort to certain co-solvents, such as methyl ethyl ketone and toluene, or toluene and tetrahydrofuran among other solvents which, when mixed with air during application of such lacquer compositions as coatings using conventional procedures, are often highly flammable.

In view of the above difficulties, it is the principal object of this invention to provide lacquer compositions of reduced flammability based on certain normally crystalline copolymers of vinylidene chloride and vinyl chloride.

It is a further object to provide such lacquer compositions which can be cast as films or coatings which are impermeable to water vapor and other gases and retain the desirable properties of clarity, heat-sealability, and other properties associated with such crystalline copolymers.

The above and related objects are accomplished by providing a solution of a substantially uniform crystalline copolymer comprising (a) between 81 and 86 percent by weight vinylidene chloride, and (b) complementarily between 19 and 14 percent by weight vinyl chloride; in a solvent selected from the group consisting of trichloroethylene and perchloroethylene.

If copolymers having relatively lower percentages of vinylidene chloride as described herein are utilized as coatings, the barrier properties of the resultant coatings become progressively poorer. Lower moisture vapor transmission rates are obtained with copolymers containing relatively higher proportions of vinylidene chloride. Thus, the copolymers of the present invention desirably contain a relatively high percentage of vinylidene chloride combined with a substantially nonpolar comonomer, which copolymer can be used to form coatings having excellent barrier properties.

The copolymer composition range as defined above does not necessarily refer to the composition of a monomer mixture employed in the preparation of the copolymer. Nor does it necessarily refer to any copolymer whose elemental analysis indicates the desired composition range. The copolymer employed in the practice of the present invention is a substantially homogeneous copolymer wherein the polymer molecules have substantially uniformly copolymerized therein vinylidene chloride in the proportion of 81 to 86 percent by weight and vinyl chloride in the proportion of 19 to 14 percent by weight. Homogeneous copolymers generally are known in the art, and are prepared by a variety of methods. One method by which the vinylidene chloride-vinyl chloride copolymers of the present invention are prepared is by the polymerization of a mixture of about 55 percent vinylidene chloride and about 45 percent vinyl chloride to a polymer conversion of about 10 percent. The resultant copolymer obtained contains from about 14 to 16 percent polymerized vinyl chloride and the remainder of the polymer is vinylidene chloride. The reactivity or tendency to polymerize of the vinyl chloride is different from that of the vinylidene chloride as the vinyl chloride adds to the copolymer chain at a slower rate than does the vinylidene chloride. Thus, the initial monomer compositions are adjusted accordingly in order that the initial copolymer formed has a desired composition. Similar copolymers or homogeneous copolymers, sometimes called "homocopolymers," are prepared readily by emulsion polymerization by the continuous or continual addition of a monomer or comonomers at a predetermined rate which is commensurate with consumption or disappearance of the monomer to polymer.

The polymers in accordance with the invention have the characteristic of being crystalline when deposited from the solvent system. Crystalline vinylidene chloride polymers exhibit higher barrier characteristics than do those of equivalent compositions when deposited in such a manner that the coating is non-crystalline, crystallinity of the coating being determined on a relative basis by the measurement of the infrared absorption at various wave lengths. A particularly beneficial and advantageous measurement is made by comparing the absorption intensity minimum at a wave length of about 955 millimicrons to that at about 930 millimicrons. The absorption at about 955 divided by the absorption at about 930 gives a ratio which is indicative of the crystalline nature of the copolymer. The ratio numerically does not vary widely from highly crystalline to medium crystalline, but does vary widely between substantially crystalline to amorphous configurations, and thus serves as an adequate indication for most purposes. Thus, if the ratio is between 0.7 and 0.8 a polymer would be substantially amorphous, whereas, if the ratio were as high as 1.10, the polymer would be highly crystalline. In vinylidene chloride-vinyl chloride copolymers of a given copolymer composition, the barrier properties are vastly improved by a relatively small change in the crystallinity. For example, a change of 0.07 in the absorption ratios heretofore mentioned could represent a change of up to 50 percent in the moisture vapor transmission properties of the coating.

Each of the solvents employed in the practice of the present invention advantageously combines the desirable properties of a relatively high flash point as compared to conventionally used solvents for forming lacquer coating solutions of vinylidene chloride polymers; the ability to easily form clear solutions of the copolymers described herein with resultant formation of transparent films and coatings; and the property of being readily volatilized upon casting of such lacquer solution. Thus, the lacquer solutions of the present invention are relatively non-flammable and may be advantageously used in the high speed casting and coating operations, particularly in those operations where sparks caused by friction and/or static electricity are a definite hazard. Such lacquer solutions may be cast to form transparent films and coatings having excellent barrier properties.

The lacquer or coating mixtures in accordance with the invention are readily prepared by dissolving the solid vinylidene chloride-vinyl chloride copolymer in the solvent, by any of the conventional means such as agitating a suspension of the polymer in the solvent at elevated temperature. By elevated temperature is meant at least about 50° C. and preferably between about 60° and 90° C. Lower temperatures require a corresponding longer time for dissolution and may not effect complete dissolution.

The concentration of the copolymer in the solvent medium will vary with the particular casting or coating method employed and the characteristics of the specific copolymer utilized. Desirably the copolymer will comprise about 10 to 20 percent by weight of the total lacquer mixture although higher or lower concentrations are utilized if advantageous.

The lacquer comprising the vinylidene chloride-vinyl chloride copolymers of the present invention are readily applied to shaped articles, such as cellophane and thermoplastic films such as polyethylene, polyethylene terphthalate and polytetrafluoroethylene, among many others, by conventional means such as spraying, brushing, dipping, rolling, and the like. Generally it is advantageous to apply a lacquer having a temperature of at least about 50° C. to alleviate the development of gels in the lacquer.

The following examples, wherein all parts and percentages are to be taken by weight, illustrate the present invention but are not to be construed as limiting its scope.

EXAMPLE 1

A mixture of 55 parts by weight of vinylidene chloride and 45 parts by weight of vinyl chloride was polymerized in the presence of 0.1 percent by weight based on the monomer mixture of azobisisobutylnitrile at a temperature of 65° C. until about 10 percent of the monomer mixture was converted to polymer. The unpolymerized components of the system were decanted and evaporated at room temperature. The remaining copolymer comprising about 14 percent vinyl chloride and 86 percent vinylidene chloride was dissolved in trichloroethylene at about 72° C. The resultant lacquer contained 15 percent by weight of the copolymer. The lacquer was aged at a temperature of about 68° C. for a period of one hour. A coating of the lacquer was cast onto a sheet of regenerated cellulose and the coating dried at a temperature of 121° C. for five mintues. The dry coating had a thickness of about 0.2 mil. Examination by infrared means as hereinbefore described indicates a crystallinity ratio of about 1.1. Measurements of moisture vapor transmission rate indicated an average value of 0.15 gram per 100 square inches per 24 hours as determined by the method outlined in TAPPI T–464 M–45 in a constant humidity cabinet at 100° F. and 90 to 95 percent relative humidity. A portion of the saran coating was heated at a rate of about 4° per minute and the crystalline melting of the polymer coating as followed by infrared absorption at 955 millimicrons was compelte at 140° C.

By way of comparison, the conventional regenerated cellulose coating comprising a copolymer containing 9 percent acrylonitrile, 91 percent vinylidene chloride was coated to an identical thickness on a similar piece of cellophane. The crystallinity of the acrylonitrile copolymer was indicated to be 1.05. The moisture vapor transmission rate was 0.128 gram per 100 square inches per 24 hours, the temperature at which crystal melting is compelte was 150° C. This coating was deposited from a hot 2:1 mixture of methyl ethyl ketone and toluene and dried at 121° C. for a period of 5 minutes. A portion of the same acrylonitrile copolymer sample was dissolved in tetrahydrofuran and deposited in a like thickness on a similar piece of cellophane. The crystallinity ratio was 0.98. The moisture vapor transmission rate was 0.30 grams per 100 square inches per 24 hours and the temperature at which crystal melting was complete was 150° C.

The high crystallinity of the copolymer coating in accordance with the invention provides barrier properties comparable with commercially used cellophane coatings and presents the further adavntage of having a crystalline melting temperature of 10° C. less. The crystalline melting temperature results in a more readily heat sealable composition which is less liable to thermal decomposition during the sealing process than are the higher melting materials.

EXAMPLE 2

A lacquer solution was prepared composed of about 20 percent by weight a copolymer comprising about 16 percent copolymerized vinyl chloride as obtained using the procedures described in Example 1, in perchloroethylene by dissolving the requisite amounts of such materials at 92° C. Similar commensurate and beneficial results are obtained when such lacquer solution is cast as a coating on regenerated cellulose using the techniques as described in Example 1.

Beneficially, increased adhesion may be obtained with copolymers in accordance with the present invention if a third monomer constituent is utilized such as copolymerizable organic acid such as acrylic acid, methacrylic acid, and the like. Such acids, may be incorporated in copolymer compositions in a proportion of from about 0.5 to about 4 percent of the total weight of the copolymer. Advantageously, such acidic components are incorporated at a level of from about 0.5 to 1.5 percent by weight of the copolymer composition.

Similar good results are attained when substantially homogeneous copolymers containing from about 14 to about 19 percent of vinyl chloride and from about 86 percent to about 81 percent vinylidene chloride are utilized with the hereinbefore described solvents.

It is to be understood that the coating compositions may be employed in the coating of a wide range of materials, for example, fibrous celluosic materials such as tissue paper, book papers, crepe paper, wrapping paper, cardboard, chipboard, wall board and the like; other films such as polyethylene terephthalate, polytetrafluoroethylene, hydroxyethyl cellulose, polyethylene, polypropylene, wood and wood products such as plywood; textiles such as cotton textiles and fabrics, rayon textiles and fabrics, other vegetable fiber products and other substrata which are relatively insoluble in the coating solutions of the present invention. For example, the coating compositions may be utilized in coating wooden vats, paper cartons such as milk cartons, wrapping papers for food products, cotton duck for use in awnings, umbrellas and the like. On the other hand, the solvent system of this invention can also be used to cast unsupported films of the vinylidene chloride copolymers disclosed herein.

What is claimed is:

1. A solution of a crystallizable copolymer, said copolymer being substantially uniform in composition wherein the polymer molecules have substantially uniformly copolymerized therein vinylidene chloride and comprising (a) between 81 and 86 percent by weight vinylidene chloride, and (b) complementarily between 19 and 14 percent by weight vinyl chloride; in a solvent selected from the group consisting of trichloroethylene, and perchloroethylene.

2. The solution of claim 1 wherein said copolymer is comprised of 86 percent by weight vinylidene chloride and 14 percent by weight vinyl chloride.

3. The solution of claim 1 wherein said copolymer is comprised of 84 percent by weight vinylidene chloride and 16 percent by weight vinyl chloride.

4. The solution of claim 1, wherein the concentration of copolymer is from about 10 to about 20 percent by weight of the total mixture.

5. Method of preparing an article having a crystalline vinylidene chloride copolymer coating comprising (1) providing a solution of a substantially uniform copolymer wherein the polymer molecules have substantially uniformly copolymerized therein vinylidene chloride comprising (a) between 81 and 86 percent vinylidene chloride and (b) complementarily between 19 and 14 percent vinyl chloride in a solvent selected from the group consisting of trichloroethylene and perchloroethylene; (2) applying a coating of said copolymer solution to said article; and (3) removing the solvent therefrom to form a continuous adherent crystalline coating.

6. The method of claim 5, wherein said article is a film.

7. The method of claim 6, wherein said film is regenerated cellulose.

8. The method of claim 5, wherein said copolymer solution is maintained at a temperature of at least about 50° C.

9. The method of claim 5, wherein said solvent is removed at a temperature of from about 100° to 150° C.

10. The method of claim 5, wherein there is copolymerized within the vinylidene-chloride copolymer from about 0.5 to about 4 parts of a copolymerizable adhesion promoting organic acid per hundred parts of vinylidene chloride-vinyl chloride in the copolymer.

References Cited by the Examiner
UNITED STATES PATENTS

| | | | |
|---|---|---|---|
| 2,901,446 | 8/1959 | Hawkins | 260—33.8 |
| 2,968,651 | 1/1961 | Friedrich et al. | 260—87.7 |
| 2,977,246 | 3/1961 | Fisher et al. | 260—87.7 |
| 3,033,812 | 5/1962 | Isaacs et al. | 260—87.7 |
| 3,041,208 | 6/1962 | Hay et al. | 260—87.7 |

MORRIS LIEBMAN, *Primary Examiner.*

D. W. ERICKSON, J. FROME, *Assistant Examiners.*